United States Patent
Fu et al.

(10) Patent No.: US 12,121,907 B1
(45) Date of Patent: Oct. 22, 2024

(54) CYCLICAL AND CONTINUOUS DEVICE AND METHOD FOR WET SIEVING OF POLYSACCHARIDE GRANULES

(71) Applicant: Hangzhou Singclean Medical Products Co., Ltd, Zhejiang (CN)

(72) Inventors: Yang Fu, Zhejiang (CN); Lingling Lyu, Zhejiang (CN); Jue Wang, Zhejiang (CN); Wei Huang, Zhejiang (CN)

(73) Assignee: Hangzhou Singclean Medical Products Co., Ltd, Hangzhou (CN)

( * ) Notice: Subject to any disclaimer, the term of this patent is extended or adjusted under 35 U.S.C. 154(b) by 0 days.

(21) Appl. No.: 18/523,848

(22) Filed: Nov. 29, 2023

(30) Foreign Application Priority Data

Sep. 30, 2023 (CN) .......................... 202311276217.0

(51) Int. Cl.
  *B03B 5/02* (2006.01)
  *B01F 27/90* (2022.01)
  *B03B 11/00* (2006.01)

(52) U.S. Cl.
  CPC ............... *B03B 5/02* (2013.01); *B01F 27/90* (2022.01); *B03B 11/00* (2013.01)

(58) Field of Classification Search
  CPC ... B01F 27/90; B03B 5/00; B03B 5/02; B03B 11/00
  USPC .......................................................... 209/273
  See application file for complete search history.

(56) References Cited

FOREIGN PATENT DOCUMENTS

| | | | | |
|---|---|---|---|---|
| CN | 203990272 U | * | 12/2014 | |
| CN | 110150380 A | * | 8/2019 | .......... A23C 9/1234 |
| CN | 216171760 U | * | 4/2022 | |
| CN | 115445474 A | * | 12/2022 | |
| CN | 113649269 B | | 8/2023 | |
| CN | 219540150 U | | 8/2023 | |
| CN | 219560478 U | | 8/2023 | |
| CN | 117160392 A | * | 12/2023 | |

* cited by examiner

*Primary Examiner* — Terrell H Matthews (57) ABSTRACT

A cyclical and continuous device and method for wet sieving of polysaccharide granules are provided. The device includes a first dosing tank, a second dosing tank connected to the first dosing tank by a first circulation pump, a first suction filtration tank connected to the second dosing tank by a second circulation pump, and a second suction filtration tank connected to the first dosing tank by a third circulation pump. An overflow port provided on a side wall of the second dosing tank is higher than a feed port of the first dosing tank. A sieve of a mesh filter for coarse powder is disposed in the first dosing tank. A sieve of a mesh filter for fine powder is disposed in the second dosing tank. A stirring device is disposed in both the first dosing tank and the second dosing tank.

7 Claims, 6 Drawing Sheets

CYCLICAL AND CONTINUOUS DEVICE AND METHOD FOR WET SIEVING OF POLYSACCHARIDE GRANULES

CROSS REFERENCE TO RELATED APPLICATIONS

The present application claims the benefit of Chinese Patent Application No. 202311276217.0 filed on Sep. 30, 2023, the contents of which are incorporated herein by reference in their entirety.

TECHNICAL FIELD

The present disclosure relates to the technical field of medical equipment, and in particular, to a cyclical and continuous device and method for wet sieving of polysaccharide granules.

BACKGROUND

The production of hemostatic granules or filler granules during the manufacture of medical equipment or during experiments requires a large quantity of microsphere granules with different particle sizes. The microsphere granules have diameters in the micrometer scale. To ensure the performance of medical equipment products, it is necessary to control the particle size ratio of microsphere granules to be processed. Sieving the granules by using a separation device can make the particle sizes of the microsphere granules conform to the production standard. In addition, a large quantity of microsphere granules with different particle sizes are also required in tests on microspheres for drug delivery in universities and research institutes. Therefore, sieving devices are widely used in medical technology.

For example, the Chinese Patent CN113649269B discloses a device for sieving biodegradable moisturizing polymer solid water, including a frame, a sieve tray, a distributor, an airhood fan, and a separator. This device implements sorting and sieving under the cyclic action of air inlet through an air inlet hood, vibration sieving through a vibration sieve tray, and air outlet through an air outlet hood, which can avoid powder dust. This sieving device can only sieve fine powder and coarse powder, but cannot sieve out medium powder at once.

In another example, the Chinese Patent CN219560478U discloses an efficient sieving machine, including a sieving device. The sieving device includes a sieve mesh for coarse materials, a sieve mesh for high-quality materials, and a sieve mesh for fine materials. A dispersing device is disposed at the top of the sieving device. The dispersing device includes a feed box. A discharge tank is fixedly connected to a lower side of the feed box. A straight bar is disposed in the middle of the discharge tank. Several helical blades are fixedly mounted on the straight bar. This patent is characterized in that helical blades and a helical disk are disposed at the top of a sieving tank and rotate driven by a motor, to disperse a mixed material discharged from the feed box to fall on the helical disk. Then, the mixed material rotates with the helical disk to an inner side wall of the sieving tank and slides down along a circular inclined plate to the sieve mesh for coarse materials, and is then vibrated for sieving, so that the mixed material is dispersed before sieving, avoiding high-quality materials from mixing with coarse and fine materials. The mixed material is processed again from the sieve mesh for coarse materials to sieve out the high-quality materials at once, thereby improving sieving efficiency. However, the sieving device in use causes dust flying and spreading, consequently polluting the surrounding environment, which not only affects the health of operators, but also increases the possibility of contamination of other products. In the related art, sieving devices are mostly of a swinging type or a shaking type, which are noisy in use. Especially, a shaking-type sieving device not only works with high noise, but also shakes out particles, and further needs to be cleaned up after a sieving process, which increases the workload and affects the sieving efficiency. In addition, mechanical sieving destroys the surface appearance or even the particle sizes of microsphere granules, resulting in a reduced yield of products.

In still another example, the Chinese Patent CN219540150U discloses a mixing stirrer for pesticide powder processing and relates to the field of pesticide preparation technologies. A vibration device includes a sieving cylinder, a vibration motor, several shock-absorbing springs, and a sieve mesh, and a feed hose is connected to a side that is of the sieving cylinder and that is away from the vibration motor. A stirring tank includes a stirring bin and an aggregate bin. A feed port is provided at an end that is of the stirring bin and that faces the vibration device. A feed hose is connected between the feed port and a collection chamber. A motor is disposed at an end that is of the aggregate bin and that is away from the stirring bin. A rotating rod is connected to an end that is of the motor and that faces the stirring bin. A spreader is disposed between the rotating rod and the feed port. A collection cylinder is disposed between the aggregate bin and the stirring bin. The vibration device can sieve the raw materials that do not meet the requirement and feed the raw materials that meet the requirement into the collection chamber, which avoids impacts of clumps or substances with large particle sizes on final products of pesticide powder. Different raw materials can be initially mixed through the vibration of the vibration motor. The foregoing device is used in the field of pesticides and still implements sieving and mixing by vibration. In this case, this device is noisy and cannot meet high requirements on the surface appearance and particle size range of powder granules in refinement industries.

Based on this, the present disclosure provides a cyclical and continuous device and method for wet sieving of polysaccharide granules to resolve the foregoing technical problems.

SUMMARY

An objective of the present disclosure is to provide a cyclical and continuous device and method for wet sieving of polysaccharide granules, to resolve the problems in the related art that powder dust is raised during sieving, high-quality powder cannot be sieved out of a mixed powder material including fine powder, high-quality powder, and coarse powder at once, surface appearance of microsphere granules is destroyed during sieving, particle sizes are reduced, and a yield is reduced. The present disclosure provides the following technical solutions.

The present disclosure discloses a cyclical and continuous device for wet sieving of polysaccharide granules, including a first dosing tank, a second dosing tank connected to the first dosing tank by a first circulation pump, a first suction filtration tank connected to the second dosing tank by a second circulation pump, and a second suction filtration tank connected to the first dosing tank by a third circulation pump. An overflow port provided on a side wall of the second dosing tank is higher than a feed port of the first dosing tank. A sieve of a mesh filter for coarse powder is disposed in the first dosing tank. A sieve of a mesh filter for fine powder is disposed in the second dosing tank. A stirring device is disposed in both the first dosing tank and the second dosing tank.

As a further improvement of the present disclosure, one end of the first circulation pump is connected to a discharge port at a bottom of the first dosing tank, the other end is connected to a feed port provided at a top of the second dosing tank, one end of the second circulation pump is connected to a suction port provided at the top of the dosing tank, the other end is connected to a feed port at a top of the first suction filtration tank, one end of the third circulation pump is connected to a suction port provided at a top of the first dosing tank, and the other end is connected to a feed port at a top of the second suction filtration tank.

As a further improvement of the present disclosure, the device further includes a third suction filtration tank connected to the second dosing tank by a fourth circulation pump, where one end of the fourth circulation pump is connected to a discharge port at a bottom of the second dosing tank, and the other end is connected to a feed port at a top of the third suction filtration tank.

As a further improvement of the present disclosure, the stirring device includes an explosion-proof inverter motor, a removable hook-type stirring shaft connected to the explosion-proof inverter motor, and a stirring blade connected to a lower end of the stirring shaft, where the stirring blade is 10-30 cm above the sieve of the filter to ensure that polysaccharide granules can be fully stirred instead of settling on a surface of the sieve of the filter.

As a further improvement of the present disclosure, the suction port is connected to a suction tube disposed in the dosing tank, one end of the suction tube is the suction port, and the other end is above the sieve of the mesh filter and is close to the sieve of the mesh filter.

As a further improvement of the present disclosure, a washing port and a quick-opening handhole are further provided at the top of the dosing tank, and the washing port is connected to a sprayer disposed in the dosing tank.

As a further improvement of the present disclosure, a pore size of the sieve of the mesh filter for coarse powder is 100-250 mesh, and a pore size of the sieve of the mesh filter for fine powder is 250-350 mesh.

The present disclosure further discloses a cyclical and continuous method for wet sieving of polysaccharide granules, including the following steps:

1) cleaning of a first dosing tank and a second dosing tank: opening washing ports and overflow ports of the first dosing tank and the second dosing tank, closing other pipeline ports, injecting purified water from the washing ports to sprayers below the washing ports, spraying, by the sprayers, the purified water all around in the dosing tanks, turning on power supplies of explosion-proof inverter motors of stirring devices to rotate stirring blades for stirring and washing, closing the washing ports when water is discharged from the overflow ports, to stop injecting the purified water, opening a discharge port at a bottom of the second dosing tank after washing to empty washing wastewater out, repeating the foregoing operations three times to complete the cleaning, and turning off the power supplies of the explosion-proof inverter motors;

2) discharge of liquid remaining in the first dosing tank: closing all the ports of the first dosing tank and the second dosing tank except the discharge ports, turning on a first circulation pump to discharge the liquid remaining in the dosing tank, and closing the discharge port at the bottom of the dosing tank;

3) addition of a to-be-sieved material: opening the overflow port, a quick-opening handhole, and the discharge port of the first dosing tank, turning on the first circulation pump and opening a feed port and the overflow port of the second dosing tank, injecting absolute alcohol through the quick-opening handhole to the overflow port of the first dosing tank until the alcohol overflows, adding the to-be-sieved material of polysaccharide granules, and turning on the power supplies of the explosion-proof inverter motors of the stirring devices of the first dosing tank and the second dosing tank for stirring for 20-60 min to disperse the material uniformly;

4) sieving of coarse powder: sieving, by a mesh filter for coarse powder, coarse powder, high-quality powder, and fine powder of the polysaccharide granules for the first time in the first dosing tank, so that the coarse powder is left on the mesh filter for coarse powder, and the high-quality powder and the fine powder pass through the mesh filter for coarse powder and are left below the mesh filter for coarse powder and at the bottom of the dosing tank, conveying, by the first circulation pump, the alcohol containing the high-quality powder and the fine powder through a material conveying pipe from the discharge port of the first dosing tank to the feed port of the second dosing tank, until the alcohol is conveyed into the second dosing tank, returning overflowed liquid through the material conveying pipe from the overflow port of the second dosing tank to a feed port of the first dosing tank, and repeating the foregoing operations for a plurality of times to continuously carry out the process of sieving of coarse powder;

5) sieving of high-quality powder and fine powder: sieving, by a mesh filter for fine powder, the high-quality powder and the fine powder of the polysaccharide granules for the second time in the second dosing tank, so that the high-quality powder is left on the mesh filter for fine powder, and the fine powder passes through the mesh filter for fine powder and is left below the mesh filter for fine powder and at the bottom of the second dosing tank; and 6) collection of the sieved high-quality powder, coarse powder, and fine powder: turning on a second circulation pump to convey the high-quality powder on the mesh filter for fine powder of the second dosing tank together with the liquid into a first suction filtration tank, turning on a third circulation pump to convey the coarse powder on the mesh filter for coarse powder of the first dosing tank together with the liquid into a second suction filtration tank, turning on a fourth circulation pump to convey the fine powder below the mesh filter for fine powder of the second dosing tank together with the liquid into a third suction filtration tank, filtering the liquid out of the first suction filtration tank, the second suction filtration tank, the third suction filtration tank, and the second dosing tank by suction, and separately collecting the high-quality powder, the coarse powder, and the fine powder that are obtained through suction filtration.

Based on this, compared with the existing methods and disclosed patents, the present disclosure has the following advantages:

(1) The sieving device used in the present disclosure is of a proper structure and easy to use, and can avoid particle dust during sieving, avoiding impacts on the surrounding environment. In addition, this device works with almost no noise, which is conducive to the physical and mental health of operators.

(2) The stirring device of the sieving device used in the present disclosure is only used for stirring the solvent to drive the polysaccharide granules to disperse uniformly in the flowing solvent, so as to implement separation by using the sieve mesh. This avoids the destruction of the surface appearance or even the particle sizes of the polysaccharide granules by conventional physical and mechanical stirring, and can effectively increase a yield or qualification rate of polysaccharide granules with a target particle size.

(3) The present disclosure has a wide application range, which can be applied to sieving of microspheres of different materials and different particle sizes. The sieving for different particle sizes can be effectively implemented by increasing quantities of dosing tanks, circulation pumps, and suction filtration tanks and configuring filters of different pore sizes in mesh. In addition, recyclable solvents are used, which is extremely economical.

(4) In the present disclosure, the overflow port of the second dosing tank is higher than the feed port of the first dosing tank, so that the liquid that overflows from the second dosing tank can automatically flows to the first dosing tank, thereby implementing automatic sieving, increasing sieving precision, and saving energy.

(5) A pneumatic opening device of the dosing tank in the present disclosure, different from the overall sealing or mechanical lock of a conventional dosing tank, has better airtightness, effectively preventing liquid leakage, can implement quick opening after sieving, and is convenient for cleaning up.

(6) The suction tube in the present disclosure is disposed above, nearly next to, the filter mesh, and is provided with several rows of uniform round holes at the tail end, which greatly improves suction efficiency and ensures that microspheres with a target particle size that are left on the sieve mesh are suctioned out.

(7) An embedded groove for the sieve mesh is specially provided on an inner wall of the dosing tank in the present disclosure, which can implement the rapid replacement of sieve meshes with different mesh sizes, greatly facilitating the switching of different products, and further increasing production efficiency.

IN THE ACCOMPANYING DRAWINGS

1—First dosing tank, 112—Quick-opening handhole, 113—Suction port, 114—Feed port, 115—Washing port, 116—Sprayer, 122—Overflow port, 123—Pneumatic opening device, 124—Discharge port, and 125—Suction tube.
2—Second dosing tank;
3—Stirring device, 31—Explosion-proof inverter motor, 32—Stirring shaft, and 33—Stirring blade;
4—First circulation pump;
5—Second circulation pump;
6—Mesh filter for coarse powder;
7—Material conveying pipe;
8—Mesh filter for fine powder; and
91—First suction filtration tank, 92—Third circulation pump, 93—Second suction filtration tank,
94—Fourth circulation pump, and 95—Third suction filtration tank.

DETAILED DESCRIPTION

The following clearly and completely describes the technical solutions of the present disclosure with reference to the accompanying drawings and embodiments. Apparently, the described embodiments are merely some rather than all of embodiments of the present disclosure. All other embodiments obtained by a person of ordinary skill in the art based on the embodiments of the present disclosure without creative efforts shall fall within the protection scope of the present disclosure.

Embodiment 1

Refer to FIG. 1, FIG. 2, FIG. 3, FIG. 4, and FIG. 5. The present disclosure discloses a cyclical and continuous device for wet sieving of polysaccharide granules, including a first dosing tank 1, a second dosing tank 2 connected to the first dosing tank 1 by a first circulation pump 4, a suction filtration tank 91 connected to the second dosing tank 2 by a second circulation pump 5, and a suction filtration tank 93 connected to the first dosing tank 1 by a third circulation pump 92. An overflow port 122 provided on a side wall of the second dosing tank 2 is higher than a feed port 114 of the first dosing tank 1. A sieve of a mesh filter 6 for coarse powder is disposed in the first dosing tank 1. A sieve of a mesh filter 8 for fine powder is disposed in the second dosing tank 2. A stirring device 3 is disposed in both the first dosing tank 1 and the second dosing tank 2. One end of the first circulation pump 4 is connected to a discharge port 124 at a bottom of the first dosing tank 1, the other end is connected to a feed port 114 provided at a top of the second dosing tank 2, one end of the second circulation pump is connected to a suction port 113 provided at the top of the dosing tank, the other end is connected to a feed port 114 at a top of the suction filtration tank 91, one end of the third circulation pump 92 is connected to a suction port 113 provided at a top of the first dosing tank 1, and the other end is connected to a feed port 114 at a top of the suction filtration tank 93. The stirring device 3 includes an explosion-proof inverter motor 31, a removable hook-type stirring shaft 32 connected to the explosion-proof inverter motor, and a stirring blade 33 connected to a lower end of the stirring shaft 32, where the stirring blade 33 is 10-30 cm above the sieve of the filter to ensure that polysaccharide granules can be fully stirred instead of settling on a surface of the sieve of the filter.

The suction port 113 provided at the top of the dosing tank of the present disclosure is connected to a suction tube 125 disposed in the dosing tank, one end of the suction tube 125 is the suction port 113, and the other end is above the sieve of the mesh filter and is close to the sieve of the mesh filter. A washing port 115 and a quick-opening handhole 112 are further provided at the top of the dosing tank, and the washing port 115 is connected to a sprayer 116 disposed in the dosing tank. A pneumatic opening device 123 is disposed between a lid and a body of the dosing tank to open the dosing tank for separation of the lid and the body of the dosing tank.

Figure 1:
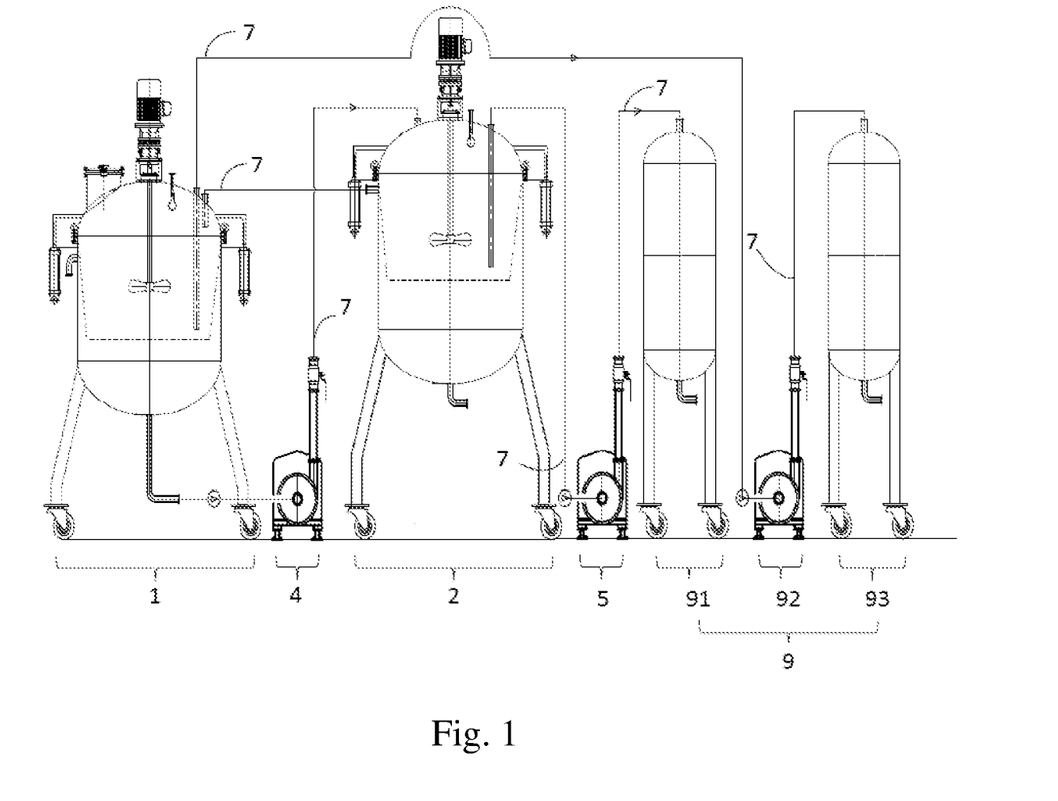
FIG. 1 is a schematic diagram of an integral structure of a cyclical and continuous device for wet sieving of polysaccharide granules in Embodiment 1.
Figure 4:
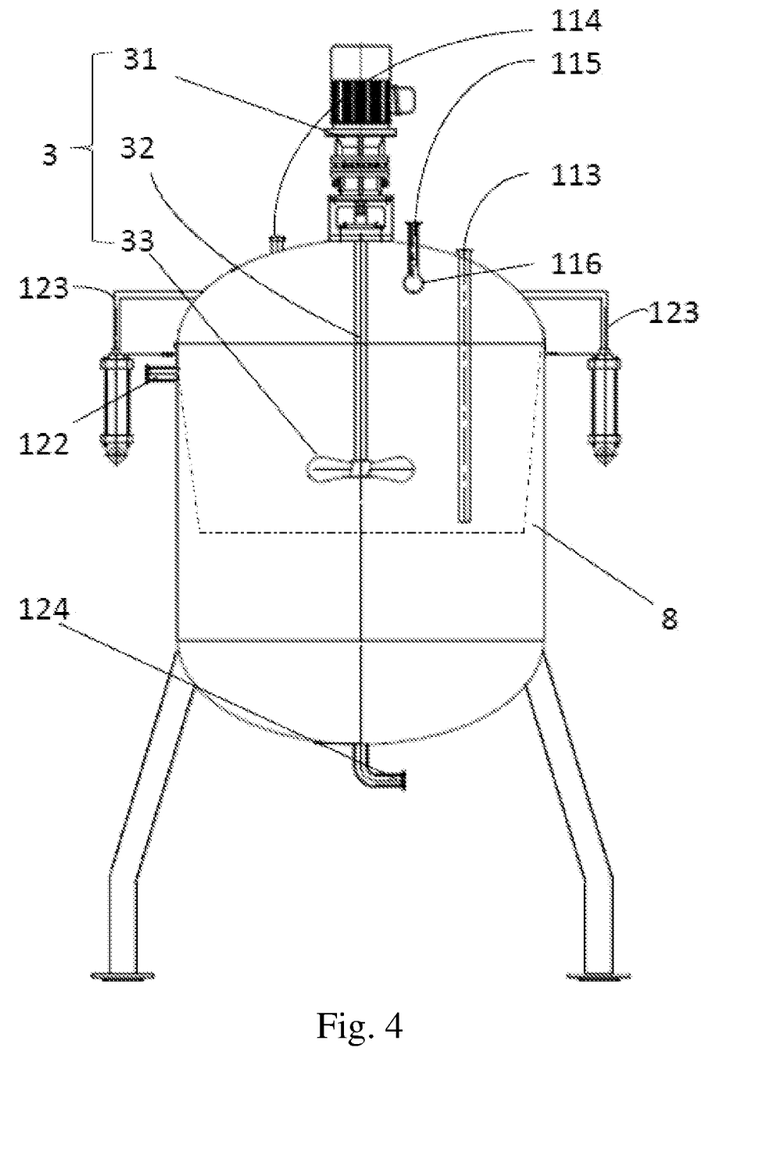
FIG. 4 is a schematic diagram of a structure of a second dosing tank of a cyclical and continuous device for wet sieving of polysaccharide granules.
Figure 5:
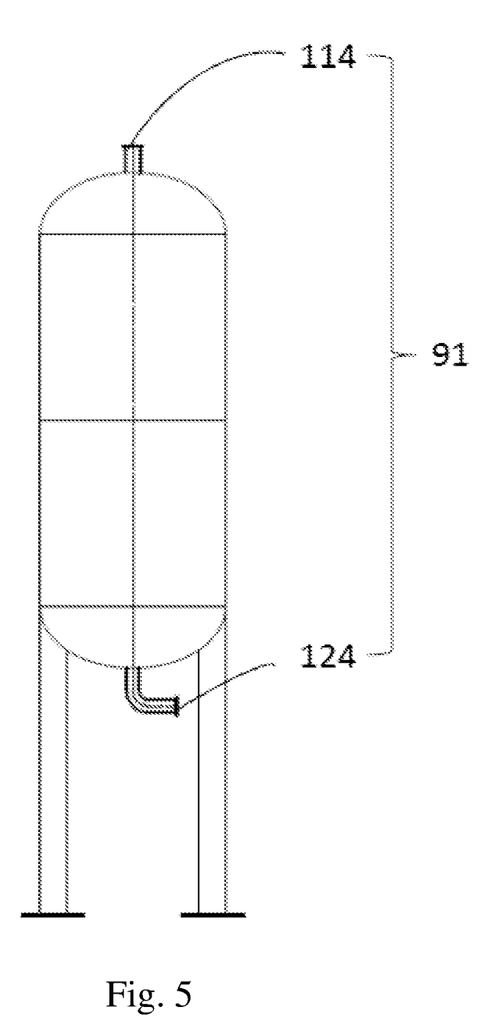
FIG. 5 is a schematic diagram of a structure of a first suction filtration tank of a cyclical and continuous device for wet sieving of polysaccharide granules.

A pore size of the sieve of the mesh filter 6 for coarse powder is 100-250 mesh, and a pore size of the sieve of the mesh filter 8 for fine powder is 250-350 mesh. The mesh filter 8 for fine powder is located below the stirring blade 33 in a cylinder of the second dosing tank 2 to sieve high-quality powder and fine powder. The second circulation pump 5 is located between the second dosing tank 2 and a suction filtration device and is connected to the suction port 113 for fine powder of the second dosing tank 2 and to the feed port 114 of the suction filtration tank 91 by the material conveying pipe 7, to convey sieved high-quality powder of polysaccharide granules to implement solid-liquid separation of a conveyed suspension containing the polysaccharide granules. The suction filtration tank 93 can implement solid-liquid separation of a conveyed suspension containing the polysaccharide granules. The third circulation pump 92 is connected to the suction port 113 of the first dosing tank 1 and to the feed port 114 of the suction filtration tank 93 by the material conveying pipe 7, to suction the powder on the filter mesh of the first dosing tank 1 into the suction filtration tank 93.

This embodiment of the present disclosure includes the following steps of using the cyclical and continuous device for wet sieving of polysaccharide granules:

Step 1: Cleaning of the dosing tank of the sieving device. Open the washing port 115 and the overflow port 122 of the first dosing tank 1 and open the washing port 115 and the overflow port 122 of the second dosing tank 2. Close other pipeline ports. Inject purified water from the washing ports 115 to the sprayers 116 below the washing ports 115 in the two dosing tanks. The sprayers 116 spray the purified water all around in the first dosing tank 1 and the second dosing tank 2. Turn on the power supplies of the explosion-proof inverter motors 31 of the stirring devices to rotate the stirring blades 33 for stirring and washing. Close the washing ports 115 of the two dosing tanks when water is discharged from the overflow ports 122, to stop injecting the purified water. Open the discharge port 124 at the bottom of the second dosing tank 2 after washing for 10 min to empty washing wastewater out. Repeat the foregoing operations three times to complete the cleaning. Turn off the power supplies of the explosion-proof inverter motors 31.

Figure 2:
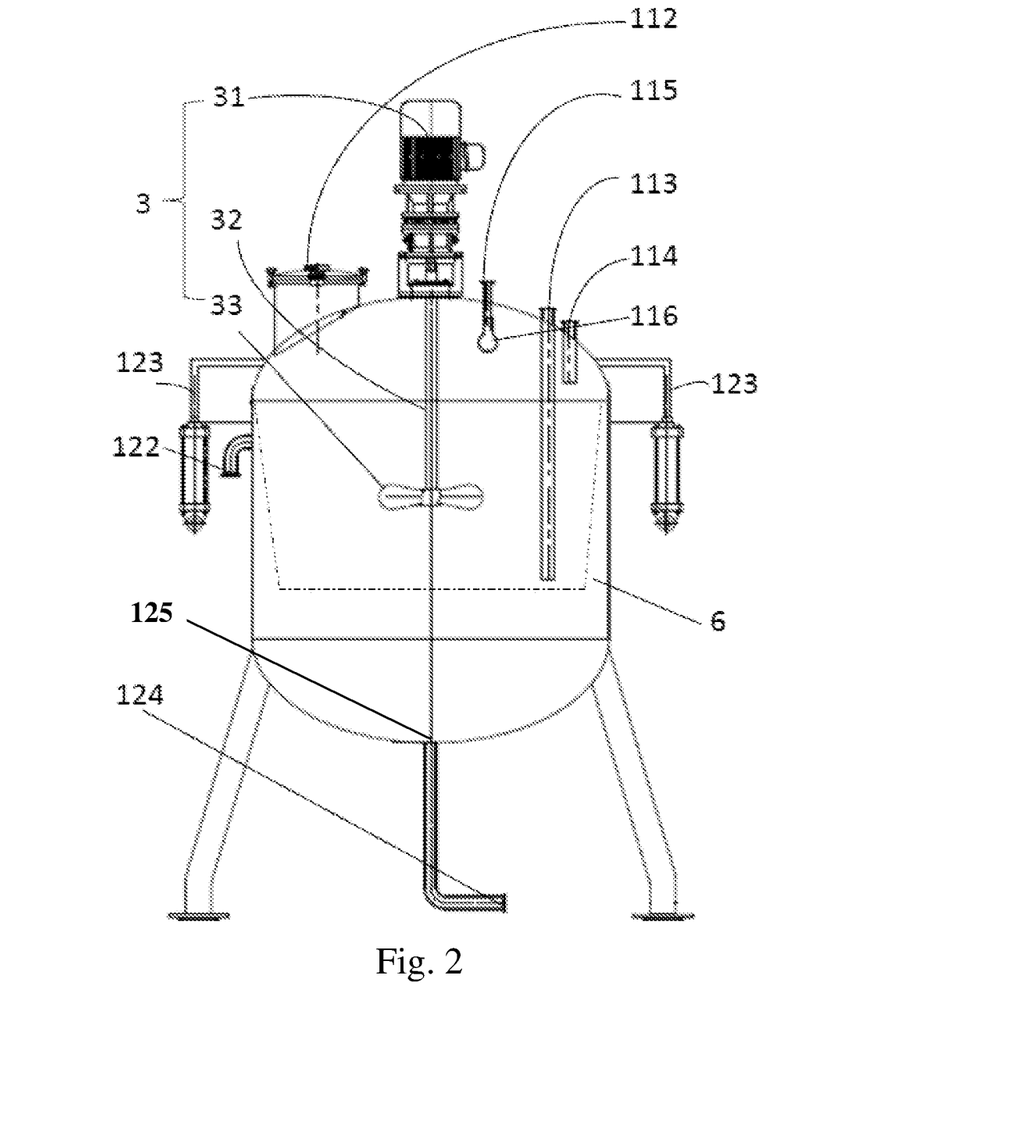
FIG. 2 is a schematic diagram of a structure of a first dosing tank of a cyclical and continuous device for wet sieving of polysaccharide granules.
Figure 3:
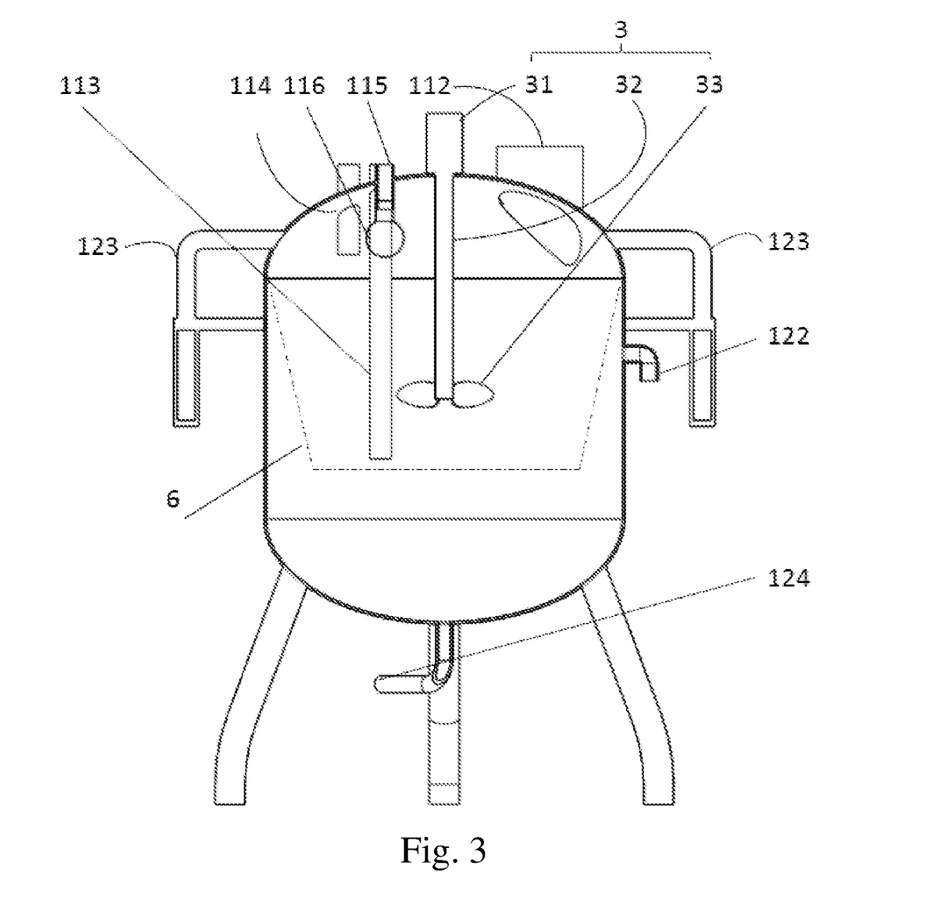
FIG. 3 is a side view of a first dosing tank of a cyclical and continuous device for wet sieving of polysaccharide granules.

Step 2: Discharge of liquid remaining in the first dosing tank 1. Close all the ports of the first dosing tank 1 and the second dosing tank 2 except the discharge ports 124. Turn on the first circulation pump 4 to discharge the liquid remaining in the dosing tank. Close the discharge port 124 at the bottom of the dosing tank.

Step 3: Addition of a to-be-sieved material. Open the overflow port 122, the quick-opening handhole 112, and the discharge port 124 of the first dosing tank 1. Turn on the first circulation pump 4 and open the feed port 114 and the overflow port 122 of the second dosing tank 2. Inject absolute alcohol through the quick-opening handhole 112 to the overflow port 122 of the first dosing tank 1 until the alcohol overflows. Add the to-be-sieved material of polysaccharide granules (such as starch, sodium carboxymethyl starch, chitosan, and sodium carboxymethyl cellulose). Turn on the power supplies of the explosion-proof inverter motors 31 of the stirring devices 3 of the first dosing tank 1 and the second dosing tank 2 for stirring for 20-60 min to disperse the material uniformly.

Step 4: Sieving of coarse powder. The mesh filter 6 for coarse powder sieves coarse powder, high-quality powder, and fine powder of the polysaccharide granules for the first time in the first dosing tank 1, so that the coarse powder is left on the mesh filter 6 for coarse powder, and the high-quality powder and the fine powder pass through the mesh filter 6 for coarse powder and are left below the mesh filter 6 for coarse powder and at the bottom of the dosing tank. The first circulation pump 4 conveys the alcohol containing the high-quality powder and the fine powder through the material conveying pipe 7 from the discharge port 124 of the first dosing tank 1 to the feed port 114 of the second dosing tank 2, until the alcohol is conveyed into the second dosing tank 2. Return overflowed liquid through the material conveying pipe 7 from the overflow port of the second dosing tank 2 to the feed port 114 of the first dosing tank 1. Repeat the foregoing operations for a plurality of times to continuously carry out the process of sieving of coarse powder.

Step 5: Sieving of high-quality powder and fine powder. The mesh filter 8 for fine powder sieves the high-quality powder and the fine powder of the polysaccharide granules for the second time in the second dosing tank 2, so that the high-quality powder is left on the mesh filter 8 for fine powder, and the fine powder passes through the mesh filter 8 for fine powder and is left below the mesh filter 8 for fine powder and at the bottom of the second dosing tank 2.

Step 6: Collection of the sieved high-quality powder, coarse powder, and fine powder. Turn on the second circulation pump 5 to convey the high-quality powder on the mesh filter 8 for fine powder of the second dosing tank 2 together with the liquid into the suction filtration tank 91. Turn on the third circulation pump 92 to convey the coarse powder on the mesh filter 6 for coarse powder of the first dosing tank 1 together with the liquid into the suction filtration tank 93. Filter the liquid out of the suction filtration tank 91, the suction filtration tank 93, and the second dosing tank 2 by suction. Separately collect the high-quality powder, the coarse powder, and bottom settlings (the fine powder) that are obtained through suction filtration. Starch-based polysaccharides were sieved based on this embodiment. Sieving effects are shown in a particle size distribution table of the sieved starch-based polysaccharides in Table 1.

TABLE 1

| Starch | D10 | D50 | D90 | Medium powder | High-quality powder | Large powder |
| --- | --- | --- | --- | --- | --- | --- |
| Sieved small and medium powder | 22.3 | 35.4 | 54.4 | 40.69% | 57.98% | 1.34% |
| | 22.5 | 35.4 | 54 | 40.42% | 58.40% | 1.18% |
| | 22.6 | 35.4 | 53.9 | 40.30% | 58.53% | 1.17% |
| Sieved medium powder | 26.2 | 38.2 | 55.6 | 19.52% | 79.21% | 1.26% |
| | 25.7 | 37.8 | 55.4 | 21.17% | 77.54% | 1.29% |
| | 25.9 | 38 | 55.7 | 20.56% | 78.09% | 1.35% |
| Not sieved | 25.6 | 39.8 | 60.5 | 37.93% | 53.41% | 8.66% |
| | 25.7 | 40 | 60.8 | 37.40% | 53.80% | 8.80% |
| | 25.9 | 40.2 | 61 | 36.83% | 54.30% | 8.87% |

TABLE 1-continued

| Starch | D10 | D50 | D90 | Medium powder | High-quality powder | Large powder |
|---|---|---|---|---|---|---|
| Sieved medium | 29.8 | 42.9 | 61.7 | 16.81% | 79.48% | 3.71% |
| powder | 29.4 | 42.5 | 61 | 17.87% | 78.72% | 3.41% |

Embodiment 2

Figure 6:
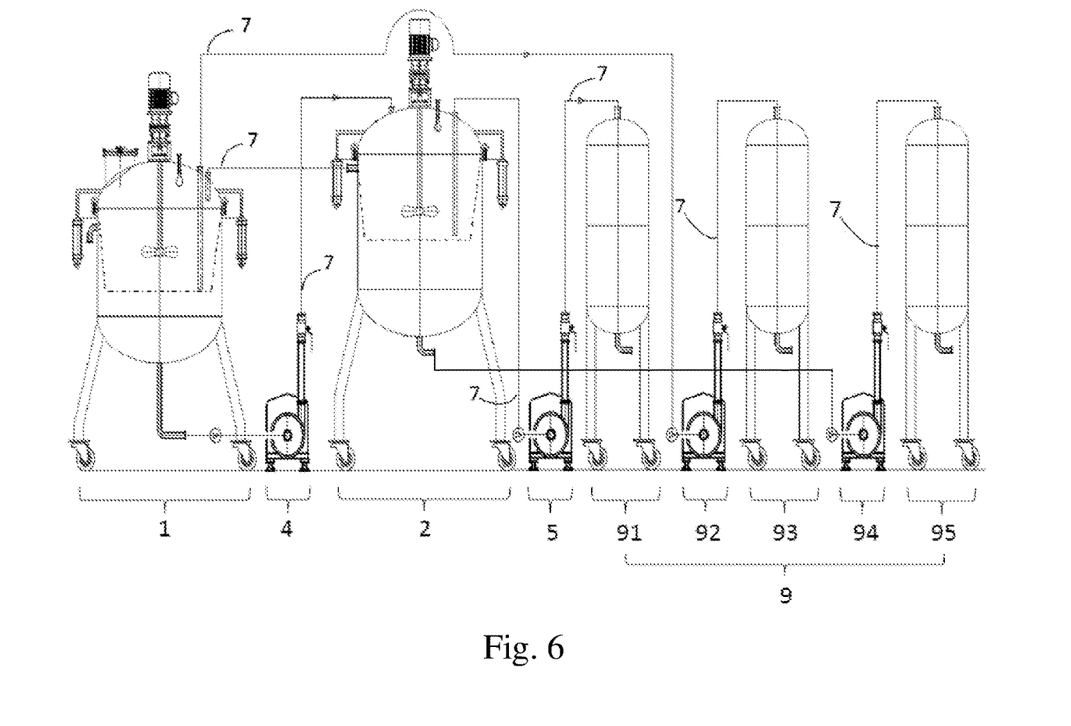
FIG. 6 is a schematic diagram of an integral structure of a cyclical and continuous device for wet sieving of polysaccharide granules in Embodiment 2.

Refer to FIG. 6. The present disclosure further includes a suction filtration tank 95 connected to the second dosing tank 2 by a fourth circulation pump 94, where one end of the fourth circulation pump 94 is connected to a discharge port 124 at a bottom of the second dosing tank 2, and the other end is connected to a feed port 114 at a top of the suction filtration tank 95. The other technical features are the same as those in Embodiment 1.

This embodiment includes the following steps of using the sieving device:

Step 1: Cleaning of the dosing tank of the sieving device. Open the washing ports 115 and the overflow ports 122 of the first dosing tank 1 and the second dosing tank 2. Close other pipeline ports. Inject purified water from the washing ports 115 of the two dosing tanks to the sprayers 116 below the washing ports 115. The sprayers 116 spray the purified water all around in the first dosing tank 1 and the second dosing tank 2. Turn on the power supplies of the explosion-proof inverter motors 31 of the stirring devices to rotate the stirring blades 33 for stirring and washing. Close the washing ports 115 when water is discharged from the overflow ports 122, to stop injecting the purified water. Open the discharge port 124 at the bottom of the second dosing tank 2 after washing for 10 min to empty washing wastewater out. Repeat the foregoing operations three times to complete the cleaning. Turn off the power supplies of the explosion-proof inverter motors 31.

Step 2: Discharge of liquid remaining in the first dosing tank 1. Close all the ports of the first dosing tank 1 and the second dosing tank 2 except the discharge ports 124. Turn on the first circulation pump 4 to discharge the liquid remaining in the dosing tank. Close the discharge port 124 at the bottom of the dosing tank.

Step 3: Addition of a to-be-sieved material. Open the overflow port 122, the quick-opening handhole 112, and the discharge port 124 of the first dosing tank 1. Turn on the first circulation pump 4 and open the feed port 114 and the overflow port 122 of the second dosing tank 2. Inject absolute alcohol through the quick-opening handhole 112 to the overflow port 122 of the first dosing tank 1 until the alcohol overflows. Add the to-be-sieved material of polysaccharide granules (such as starch, sodium carboxymethyl starch, chitosan, and sodium carboxymethyl cellulose). Turn on the power supplies of the explosion-proof inverter motors 31 of the stirring devices of the first dosing tank 1 and the second dosing tank 2 for stirring for 20-60 min to disperse the material uniformly.

Step 4: Sieving of coarse powder. The mesh filter 6 for coarse powder sieves coarse powder, high-quality powder, and fine powder of the polysaccharide granules for the first time in the cylinder of the first dosing tank 1, so that the coarse powder is left on the mesh filter 6 for coarse powder, and the high-quality powder and the fine powder pass through the mesh filter 6 for coarse powder and are left below the mesh filter 6 for coarse powder and at the bottom of the dosing tank. The first circulation pump 4 conveys the alcohol containing the high-quality powder and the fine powder through the material conveying pipe 7 from the discharge port 124 of the first dosing tank 1 to the feed port 114 of the second dosing tank 2, until the alcohol is conveyed into the cylinder of the second dosing tank 2. Return overflowed liquid through the material conveying pipe 7 from the overflow port of the second dosing tank 2 to the feed port 114 of the first dosing tank 1. Repeat the foregoing operations for a plurality of times to continuously carry out the process of sieving of coarse powder.

Step 5: Sieving of high-quality powder and fine powder. The mesh filter 8 for fine powder sieves the high-quality powder and the fine powder of the polysaccharide granules for the second time in the cylinder of the second dosing tank 2, so that the high-quality powder is left on the mesh filter 8 for fine powder, and the fine powder passes through the mesh filter 8 for fine powder and is left below the mesh filter 8 for fine powder and at the bottom of the second dosing tank 2.

Step 6: Collection of the sieved high-quality powder, coarse powder, and fine powder. Turn on the second circulation pump 5 to convey the high-quality powder on the mesh filter 8 for fine powder of the second dosing tank 2 together with the liquid into the suction filtration tank 91. Turn on the third circulation pump 92 to convey the coarse powder on the mesh filter 6 for coarse powder of the first dosing tank 1 together with the liquid into the suction filtration tank 93. Turn on the fourth circulation pump 94 to convey the fine powder below the mesh filter 8 for fine powder of the second dosing tank 2 together with the liquid into the suction filtration tank 95. Filter the liquid out of the suction filtration tank 91, the suction filtration tank 93, the suction filtration tank 95, and the second dosing tank 2 by suction. Separately collect the high-quality powder, the coarse powder, and the fine powder that are obtained through suction filtration.

The foregoing embodiments are merely descriptions of preferred implementations of the present disclosure, but do not limit the scope of the present disclosure. Various transformations and improvements of the technical solutions of the present disclosure that are made by a person of ordinary skill in the art without departing from the design spirit of the present disclosure shall fall within the protection scope determined by the claims of the present disclosure.

What is claimed is:

1. A cyclical and continuous device for wet sieving of polysaccharide granules, comprising a first dosing tank, a second dosing tank connected to the first dosing tank by a first circulation pump, a first suction filtration tank connected to the second dosing tank by a second circulation pump, and a second suction filtration tank connected to the first dosing tank by a third circulation pump, wherein an overflow port provided on a side wall of the second dosing tank is higher than a feed port of the first dosing tank, a sieve of a mesh filter for coarse powder is disposed in the first dosing tank, a sieve of a mesh filter for fine powder is disposed in the second dosing tank, and a stirring device is disposed in both the first dosing tank and the second dosing tank;

wherein one end of the first circulation pump is connected to a discharge port at a bottom of the first dosing tank, another end of the first circulation pump is connected to a feed port provided at a top of the second dosing tank, one end of the second circulation pump is connected to a suction port provided at the top of the second dosing tank, another end of the second circulation pump is connected to a feed port at a top of the first suction filtration tank, one end of the third circulation pump is connected to a suction port provided at a top of the first dosing tank, and another end of the third circulation pump is connected to a feed port at a top of the second suction filtration tank.

2. The cyclical and continuous device for wet sieving of polysaccharide granules according to claim 1, further comprising a third suction filtration tank connected to the second dosing tank by a fourth circulation pump, wherein one end of the fourth circulation pump is connected to a discharge port at a bottom of the second dosing tank, and another end of the fourth circulation pump is connected to a feed port at a top of the third suction filtration tank.

3. The cyclical and continuous device for wet sieving of polysaccharide granules according to claim 2, wherein each stirring device comprises an explosion-proof inverter motor, a removable hook-type stirring shaft connected to the explosion-proof inverter motor, and a stirring blade connected to a lower end of the stirring shaft, wherein the stirring blade is 10-30 cm above the sieve of the filter to ensure that polysaccharide granules can be fully stirred instead of settling on a surface of the sieve of the filter.

4. The cyclical and continuous device for wet sieving of polysaccharide granules according to claim 3, wherein each suction port is connected to a suction tube disposed in a corresponding dosing tank, one end of the suction tube is the suction port, and another end of the suction tube is above the sieve of the mesh filter and is close to the sieve of the mesh filter.

5. A cyclical and continuous device for wet sieving of polysaccharide granules, comprising a first dosing tank, a second dosing tank connected to the first dosing tank by a first circulation pump, a first suction filtration tank connected to the second dosing tank by a second circulation pump, and a second suction filtration tank connected to the first dosing tank by a third circulation pump, wherein an overflow port provided on a side wall of the second dosing tank is higher than a feed port of the first dosing tank, a sieve of a mesh filter for coarse powder is disposed in the first dosing tank, a sieve of a mesh filter for fine powder is disposed in the second dosing tank, and a stirring device is disposed in both the first dosing tank and the second dosing tank, wherein a washing port and a quick-opening handhole are further provided at a top of each dosing tank, and the washing port is connected to a sprayer disposed in the dosing tank.

6. The cyclical and continuous device for wet sieving of polysaccharide granules according to claim 5, wherein a pore size of the sieve of the mesh filter for coarse powder is 100-250 mesh, and a pore size of the sieve of the mesh filter for fine powder is 250-350 mesh.

7. A cyclical and continuous method for wet sieving of polysaccharide granules, comprising following steps:

cleaning of a first dosing tank and a second dosing tank including: opening washing ports and overflow ports of the first dosing tank and the second dosing tank, closing other pipeline ports, injecting purified water from the washing ports to sprayers below the washing ports, spraying, by the sprayers, the purified water all around in the dosing tanks, turning on power supplies of explosion-proof inverter motors of stirring devices to rotate stirring blades for stirring and washing, closing the washing ports when water is discharged from the overflow ports, to stop injecting the purified water, opening a discharge port at a bottom of the second dosing tank after washing to empty washing wastewater out, repeating the cleaning three times to complete the cleaning, and turning off the power supplies of the explosion-proof inverter motors;

discharge of liquid remaining in the first dosing tank including: closing all the ports of the first dosing tank and the second dosing tank except the discharge ports, turning on a first circulation pump to discharge the liquid remaining in the first dosing tank, and closing the discharge port at the bottom of the first dosing tank;

addition of a to-be-sieved material including: opening the overflow port, a quick-opening handhole, and the discharge port of the first dosing tank, turning on the first circulation pump and opening a feed port and the overflow port of the second dosing tank, injecting absolute alcohol through the quick-opening handhole to the overflow port of the first dosing tank until the alcohol overflows, adding the to-be-sieved material of polysaccharide granules, and turning on the power supplies of the explosion-proof inverter motors of the stirring devices of the first dosing tank and the second dosing tank for stirring for 20-60 min to disperse the material uniformly;

sieving of coarse powder including: sieving, by a mesh filter for coarse powder, coarse powder, high-quality powder, and fine powder of the polysaccharide granules for the first time in the first dosing tank, so that the coarse powder is left on the mesh filter for coarse powder, and the high-quality powder and the fine powder pass through the mesh filter for coarse powder and are left below the mesh filter for coarse powder and at the bottom of the first dosing tank, conveying, by the first circulation pump, the alcohol containing the high-quality powder and the fine powder through a material conveying pipe from the discharge port of the first dosing tank to the feed port of the second dosing tank, until the alcohol is conveyed into the second dosing tank, returning overflowed liquid through the material conveying pipe from the overflow port of the second dosing tank to a feed port of the first dosing tank, and repeating the sieving of coarse powder for a plurality of times to continuously carry out the process of sieving of coarse powder;

sieving of high-quality powder and fine powder including: sieving, by a mesh filter for fine powder, the high-quality powder and the fine powder of the polysaccharide granules for the second time in the second dosing tank, so that the high-quality powder is left on the mesh filter for fine powder, and the fine powder passes through the mesh filter for fine powder and is left below the mesh filter for fine powder and at the bottom of the second dosing tank; and collection of the sieved high-quality powder, coarse powder, and fine powder including: turning on a second circulation pump to convey the high-quality powder on the mesh filter for fine powder of the second dosing tank together with the liquid into a first suction filtration tank, turning on a third circulation pump to convey the coarse powder on the mesh filter for coarse powder of the first dosing tank together with the liquid into a second suction filtration tank, turning on a fourth circulation pump to convey the fine powder below the mesh filter for fine powder of the second dosing tank together with the liquid into a third suction filtration tank, filtering the liquid out of the first suction filtration tank, the second suction filtration tank, the third suction filtration tank, and the second dosing tank by suction, and separately collecting the high-quality powder, the coarse powder, and the fine powder that are obtained through suction filtration.

\* \* \* \* \*